July 25, 1972     P. T. HAHM     3,679,600

CONTAINER WITH MEANS FOR DEFOAMING FOAMING LIQUIDS

Filed Nov. 23, 1970     2 Sheets-Sheet 1

PAUL T. HAHM
INVENTOR.

BY

ATTORNEYS

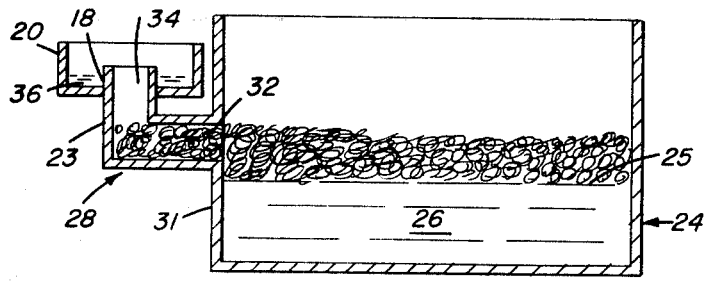
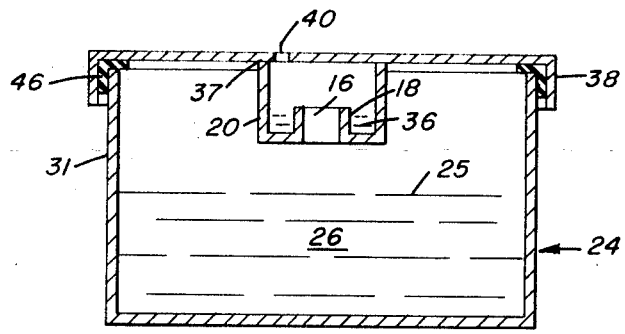
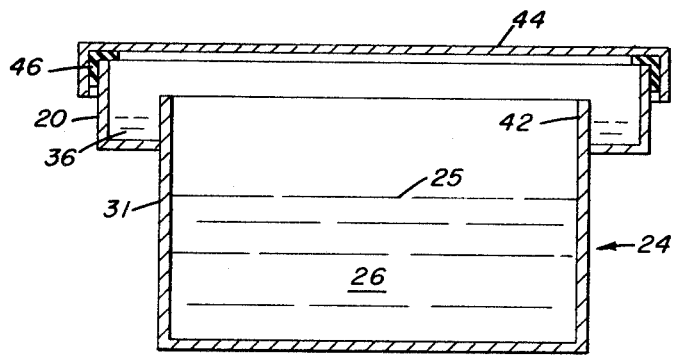

United States Patent Office 3,679,600
Patented July 25, 1972

3,679,600
CONTAINER WITH MEANS FOR DEFOAMING FOAMING LIQUIDS
Paul Timothy Hahm, Rochester, N.Y., assignor to Eastman Kodak Company, Rochester, N.Y.
Filed Nov. 23, 1970, Ser. No. 92,040
Int. Cl. B01d *19/00;* C12b *1/00, 1/18*
U.S. Cl. 252—361
4 Claims

ABSTRACT OF THE DISCLOSURE

An improved container for liquids which, upon mixing, agitation, aeration etc., tend to foam and means for adding an antifoaming agent to such a liquid in a controlled fashion are disclosed. The improved container comprises a vessel having a liquid level, means above said liquid level communicating the interior of said vessel to at least one horizontally disposed orifice opening to a recessed antifoaming agent reservoir. A novel antifoaming agent supply lid embodying the foregoing structure is also described.

FIELD OF THE INVENTION

The instant invention relates to an improved container for foaming liquids and more specifically to such a container which is capable of supplying to a foaming solution controlled amounts of antifoaming agent on an "as-required" basis.

PRIOR ART

The control of foam in a wide variety of mixing, stirring, agitation, aeration, etc. applications is a perplexing problem well known to those skilled in these arts. In many of these procedures the addition of an antifoaming agent before performance of the foam causing operation provides satisfactory results, however, in certain other applications, as for example the aeration of bleach-fix solutions in the processing of photographic papers, such methods do not work satisfactorily since, on standing, the antifoaming agent apparently separates from the solution and upon aeration foaming occurs. It therefore becomes necessary to add the antifoaming agent during areation or agitation, a procedure which generally requires either the full time of an operator or some relatively expensive and somewhat sophisticated foam sensing and antifoaming agent dispensing apparatus in order that the foam be controlled at all times.

OBJECT

It is therefore an object of the present invention to provide a simple yet dependable method and apparatus to control foam in stirring, mixing, agitating and aerating operations where the formation of foam is best controlled on a continuing basis and antifoaming agent is added at intervals "as-required."

BRIEF DESCRIPTION OF THE DRAWINGS

This and other objects and advantages of the present invention will be made obvious to those skilled in the art when the following description is considered in conjunction with the accompanying drawings of which:

FIG. 5 depicts an alternative preferred embodiment of the container of the present invention;

FIG. 6 depicts another alternative preferred embodiment of the container of the present invention; and FIG. 7 depicts yet another alternative embodiment of the container of the present invention.

SUMMARY OF THE INVENTION

According to the present invention there is provided an improved container for liquids which tend to foam, upon mixing, agitation, aeration etc. The container provides a means for adding antifoaming agent to such a solution in a controlled fashion. The improved container comprises a vessel having a liquid level, and means above said liquid level communicating the interior of the vessel to at least one horizontally disposed orifice opening to a recessed antifoaming agent reservoir.

According to a preferred embodiment of the present invention a foaming liquid container is fitted with an antifoaming agent supply lid comprising a lid structure designed to fit the container and means supported by said lid for communicating the interior of the container with at least one horizontally disposed orifice opening to a recessed antifoaming agent reservoir.

A further preferred embodiment of the container of the present invention comprises a vessel equipped with an antifoaming agent supply lid comprising a lid structure having an inner and an outer surface and at least one aperture therein, each of said at least one apertures having a first peripheral flange surrounding the aperture on the outer surface of said lid and a second peripheral flange also on the outer surface of said lid structure of greater vertical height than, spatially removed from and surrounding said first peripheral flange to provide an antifoaming reservoir between said first and second peripheral flanges an dsaid outer surface of said lid. Other embodiments of the container of the present invention are described hereinafter.

DETAILED DESCRIPTION OF THE INVENTION

Figure 1:
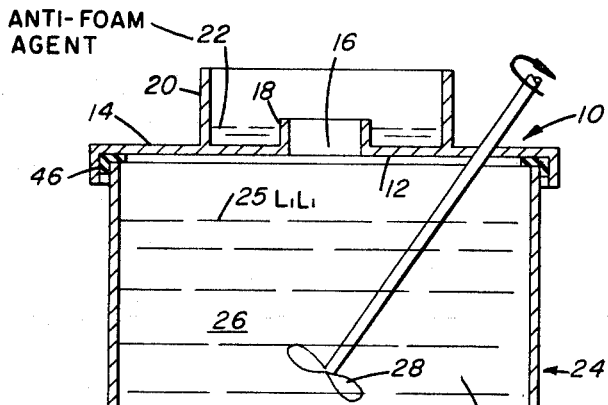
FIG. 1 is a cross-sectional view of a partially filled mixing container showing the antifoaming agent dispersing lid which forms a preferred embodiment of the present invention.
Figure 2:
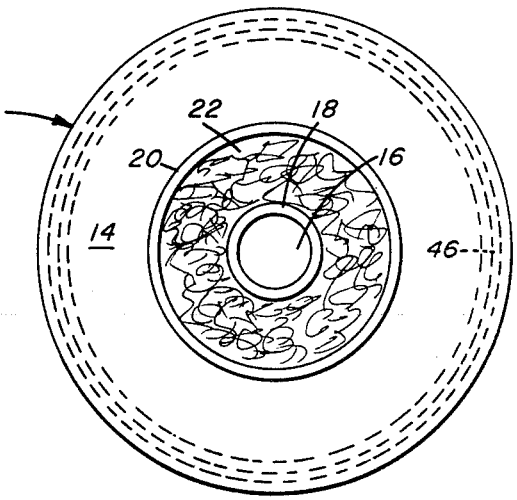
FIG. 2 is a top plan view of the container of FIG. 1.

As shown in FIG. 1, a preferred embodiment of the novel container of the present invention comprises vessel 24 fitted with a lid structure 10 having an inner surface 12 and an outer surface 14. Lid structure or portion 10 acts as a base member having at least one orifice aperture or conduit 16 therein whose lower end is above the liquid level 25 in vessel 24. Orifice 16 is surrounded by a first upright peripheral flange 18 on the outer surface 14 of lid structure 10, and peripheral flange 18 is in turn surrounded by a second upright peripheral flange 20 also on the outer surface 14 of lid structure 10. Second peripheral flange 20 is higher than first peripheral flange 18 by a suitable amount as described in detail hereinafter. The arrangement of flanges 18 and 20 and lid structure or base member 10 (which connects the two flanges together at their bottoms) thus provide an antifoaming agent reservoir 22 at a level above the liquid level 25 in vessel 24, which can be filled with a suitable antifoaming agent; and the upper end of conduit 16 extends above the surface 14 which forms the lowermost portion of reservoir 22 so that antifoam agent in the lowermost portion of the reservoir is below the upper end of conduit 16, whereby antifoaming agent contained in the reservoir can overflow from the reservoir through the conduit 16 to the interior of vessel 24 to control foam in the vessel when such foam rises into the reservoir via conduit 16, liquefying upon contacting the antifoam agent and raising its level to overflow into vessel 24.

In use and as shown in FIG. 1, the improved container of the present invention is partially filled to liquid level 25 with a solution 26 which foams on stirring with mixer 28 or on aeration etc.

Figure 3:
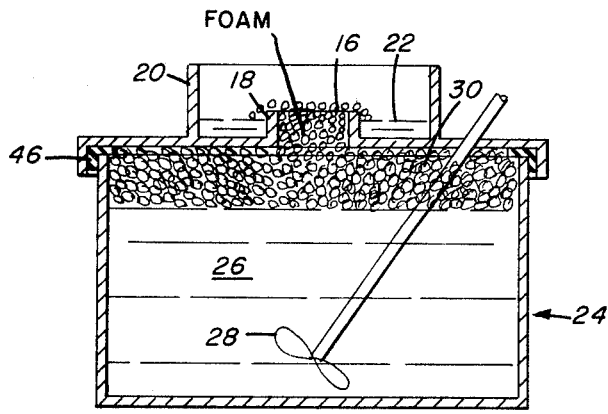
FIG. 3 is a cross-sectional side view of the covered vessel of FIG. 1 showing the liquid contained therein in a foaming condition.
Figure 4:
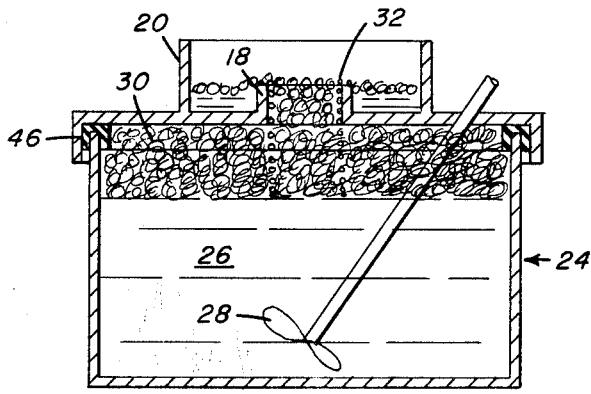
FIG. 4 is a cut-away side view of the covered vessel of FIG. 1 showing the foam initiated, controlled addition of antifoaming agent to the liquid.

As shown in FIG. 3, upon agitation of liquid 26 with mixer 28 a foam 30 forms. As agitation continues foam 30 rises through orifice 16 and over flange 18 to contact the surface of the antifoaming agent contained in reservoir 22. Immediately upon contact with the antifoaming agent, the foam 30 is liquified and drops into reservoir 22. When sufficient foam has been liquified to raise the level of the antifoaming agent over the top of flange 18 (as depicted in FIG. 4) drops 32 thereof fall into the vessel 24, contact foam 30 and return the liquid to the state shown in FIG. 1.

In this fashion, antifoaming agent is added to the foaming liquid in a controlled fashion and then only when it is needed. As soon as sufficient agent has been added to dissipate any excess of foam, antifoaming agent addition ceases until agitation, aeration etc. again generates sufficient foam to require further additions thereof.

According to the preferred embodiment depicted in the accompanying drawings, the orifice 16 is centrally located. If a single lid orifice, reservoir etc. are used it is of course best to locate the single orifice 16 as close to the center of lid structure 10 as possible. However, it may be advantageous in many applications to provide a multiplicity of orifices each having its own antifoaming agent reservoir and this embodiment is clearly contemplated by the description contained herein. Furthermore, the concept of a plurality of lid orifices surrounded by only a single antifoaming agent reservoir is also quite possible. Yet another alternative would provide a reservoir extending about only a portion of the orifice periphery with an extended flange extending about the balance thereof.

An alternate preferred embodiment of the container of the present invention is depicted in FIG. 5. According to this embodiment, vessel 24, which is partially filled to liquid level 25 with a foaming liquid 26 is equipped with a conduit 28 which penetrates side 31 of vessel 24 through aperture 32 which is located at a point above liquid level 25. Conduit 28 terminates in a vertically mounted orifice 34 which is identical to that depicted at 16 in FIG. 1. The antifoaming agent reservoir 36, although not located in or on a lid for vessel 24 is identical to that shown in FIG. 1, it having a first peripheral flange 18 and a second peripheral flange 20 which is higher than, spatially removed from and connected to peripheral flange 18. According to this embodiment, vessel 24 may, but need not, be covered with a suitable lid depending upon the length and mounting angle of portion 23 of conduit 28.

A further alternative embodiment of the container of the present invention is depicted in FIG. 6 wherein vessel 24, partially filled with liquid 26 to liquid level 25, is covered with a lid 38 and antifoaming agent reservoir 36 is suspended from the inner surface of lid 38, access thereto for purposes of replenishment being achieved through aperture 40 in lid 38. Access to reservoir 36 by the foam generated when the liquid is agitated is gained through orifice 16 which is surrounded by peripheral flanges 18 and 20, the latter serving to maintain reservoir 36 in position on the inner surface of lid 38 by virtue of its attachment thereto along line 37. It is of course possible to mount a plurality of reservoirs of this type on the inner lid of any given container.

A final alternate embodiment of the present invention comprises, as shown in FIG. 7, using the top portion 42 of vessel wall 31 as the first peripheral flange and equipping the outside of the container with a second peripheral flange 20, as shown, to provide an antifoaming agent reservoir 36 about the entire periphery of vessel 24. Such a container could be further equipped with a lid 44 which rested on peripheral flange 20, as shown. As already described above, it should be obvious that although a peripheral reservoir will perform most efficiently the reservoir need not extend entirely about horizontally disposed orifice 16.

Although not a critical aspect of the instant invention, it is clearly advantageous to equip any of the containers which have lids with suitable gaskets 46 to insure that no leakage of foam from under the lid occurs.

The concept of an improved lid as described herein is further readily adaptable to any suitable container or mixing vessel, it being possible to make lids of the types described to fit almost any existing container, or similarly adapting the embodiment of FIG. 5, it not being in any sense critical what shape or size the container is so long as the lid or conduit may be fitted thereon.

The height of flange 20 in each embodiment must of course be greater than that of flange 18 to insure that as the foam liquifies and is deposited into reservoir 22 the overflow of antifoaming agent induced thereby is an overflow through orifice 16 and not out onto outer surface 14 of lid structure 10 or in some other undesirable direction. In some applications wherein large amounts of foam can be expected to be generated in a very short period, it might be advisable to make outer flange 20 substantially higher, i.e. on the order of 2;3 times higher than inner flange 18, to insure no foam has an opportunity to escape from the boundaries of reservoir 22 prior to liquification by contact with the antifoaming agent.

The particular materials used to manufacture the lid of this invention, of course, form no critical part thereof and the number and variety of materials, sizes and shapes to which the antifoaming supply lid or improved container of the present invention may be varied are limited only by the imagination of the designer and the requirements dictated by the various mixing, agitating aerating, etc. vessels to which the lid structure or reservoir structure is adaptable.

It is obvious that many changes and modifications can be made in the above-described details without departing from the nature and spirit of the invention and it is to be understood that the invention is clearly not limited to said details.

There has thus been described an improved container for solutions which tend to foam and means for adding an antifoaming agent to such liquids in a controlled fashion.

I claim:

1. A container for treating liquids susceptible to foaming comprising (a) a vessel having a liquid level; (b) a reservoir level above the vessel liquid level; and (c) conduit means whose lower end is above the vessel liquid level communicating the interior of the vessel with the reservoir, the upper end of said conduit means extending above the lowermost portion of said reservoir, said reservoir arranged to contain in antifoaming agent in the lowermost portion thereof below the upper end of said conduit means, whereby antifoaming agent contained in said reservoir can overflow from said reservoir thru said conduit means to the interior of said vessel to control foam generated in said liquid when said foam rises into said reservoir via said conduit means, liquefying upon contacting said anti-foaming agent and raising its level to overflow into the vessel.

2. The container of claim 1 wherein said conduit means comprises at least one horizontally disposed orifice, and said reservoir comprises a first, upright peripheral flange about said orifice, a second upright peripheral flange, of greater vertical height than, spatially removed from and surrounding said first peripheral flange, and a base member forming the lowermost portion of said reservoir and connecting said first and second peripheral flanges at their bottoms.

3. The container of claim 1 including a lid portion for said vessel and wherein said conduit means comprises at least one aperture in said lid portion and said reservoir is supported by said lid portion.

4. The container of claim 3 wherein said conduit means comprises a single centrally located aperture in said lid portion.

References Cited

UNITED STATES PATENTS

| | | | |
|---|---|---|---|
| 2,379,338 | 6/1945 | Bingman | 55—178 X |
| 2,379,396 | 6/1945 | Ziliotto | 55—178 X |
| 2,981,693 | 4/1961 | Browne et al. | 252—361 X |
| 3,425,952 | 2/1969 | Gaughan et al. | 252—361 |
| 3,427,252 | 2/1969 | Gaughan et al. | 252—361 |
| 2,206,507 | 7/1940 | Kuhni | 252—361 |
| 2,184,195 | 12/1939 | Navller | 55—178 |
| 3,224,964 | 12/1965 | Derenk | 252—361 |

NORMAN YUDKOFF, Primary Examiner

J. SOFER, Assistant Examiner

U.S. Cl. X.R.

55—178; 195—107; 252—321